United States Patent Office 2,940,866
Patented June 14, 1960

2,940,866
HEAT SENSITIVE COPY SHEET

Robert H. Sprague, Haddam Neck, and Dominick R. Friello, Middletown, Conn., assignors to Sperry Rand Corporation, New York, N.Y., a corporation of Delaware No Drawing. Filed Apr. 10, 1957, Ser. No. 651,823

18 Claims. (Cl. 117—36)

This invention relates to duplicator materials. More particularly, it is concerned with novel compositions of matter which are heat sensitive and which, when provided as a coating on sheet materials, may be utilized in the preparation of duplicate copies of printed or other graphic subject matter by exposure to heat, such as irradiation, and without requiring subsequent developing or fixing operations.

Compositions exist in the prior art which may be heat sensitive. However, as far as is known, these compositions all have characteristics which present disadvantages. For example, many compositions are known which are both heat and light sensitive. Some of such compositions require an extremely high temperature, or heating for a relatively long time at a specific temperature, or heating over a wide range of temperatures to produce a visible change of sufficient intensity. The change obtained at elevated temperatures may be reversible on cooling, i.e., the product exhibits thermotropy.

In addition to these above listed disadvantages, these compositions are affected deleteriously due to the interaction of their constituents with substances in the atmosphere, viz; moisture and carbon dioxide. Thus, absorbed moisture may furnish a solvent for the components causing development of overall color upon standing, or a coating composition stabilized in an alkaline state may be neutralized by absorbed carbon dioxide with a similar result. Thus, when such compositions are coated on to sheet materials, the shelf life of such coated materials is quite short.

It is accordingly, the primary object of this invention to provide a novel heat sensitive composition, adaptable for use as a coating on sheet materials in facsimile duplication processes, which is insensitive to light, and which, upon the application of heat, gives a visible change of sufficient intensity when heated for a short period over a relatively narrow range of temperature.

It is a further object to provide a heat sensitive composition in accordance with the preceding object which is characterized by stability and long shelf life.

In accordance with the present invention, there is provided a heat sensitive copying sheet comprising a support and a heat sensitive layer, the heat sensitive layer comprising a colorless carbinol base derived from a member of the group consisting of the triphenylmethane dyes and styryl dye bases, an acid-former and a film former.

For a better understanding of the present invention together with other and further objects thereof, reference is had to the following description and its scope will be pointed out in the appended claims.

The heat sensitive coating composition of this invention comprises a mixture of one or more colorless carbinol bases, derived from triphenylmethane dyes or styryl dye bases, together with a material capable of causing color formation when the constituents of the composition are in the melted state. The materials causing the color formation generally fall into a class which is termed "acid-former" since the color formation is due to the halochromic shift brought about by the conversion of the carbinol base to the triphenylmethane dye. Examples of acid-former compounds are amides in general including such amides as benzamide, chloroacetamide, 2-naphthylacetamide, hydroxy ethylphthalimide, and hydrated zinc acetate.

The mixture of dye base and acid-former is dispersed in a finely divided state in a solution of a film former such as polyvinyl alcohol, ethyl cellulose, hydroxyethyl cellulose, and sodium polyacrylate in water or alcohol. The film former acts as a binder to hold the mixture in suspension on the surface of the paper and also, in the case of ethyl cellulose, to protect the sensitive ingredients from the action of atmospheric moisture and carbon dioxide.

In addition, it is preferable to add a stabilizng agent to prevent formation of overall color in the coated material on standing. Compounds suitable for use as such stabilizing agents are strongly alkaline materials such as the alkali hydroxides, alkali carbonates, quaternary ammonium hydroxides such as choline, tetramethylammonium hydroxide and triton $\beta$ or mixtures of these.

In one embodiment of the invention, a coating comprising the above constituents is placed on a sheet material, preferably a translucent paper such as glassine. The coated surface of such a sheet is placed in contact with an original containing graphic subject matter to give direct positive copies by reflex printing using relatively high intensity infrared radiation in a suitable exposing device.

In a second embodiment of the invention, there is provided a sheet material with a duplex coating thereon which comprises two layers. A first layer thereof comprises the dye base and the stabilizing agent dispersed in a film former. This layer is first applied to the sheet and then the second layer comprising the acid-former dispersed in a film former is applied to the first layer. A typical example of the second embodiment is a coating composition comprising a solution of the methyl ether of the carbinol base of Crystal Violet and a 10% solution of polymethylmethacrylate in dioxane stabilized with piperidine. This mixture is coated on glassine paper, dried, and a topcoat comprising a suspension of finely divided hydrated zinc acetate in a 5% solution of rubber in ligroin is then applied. A whitening agent such as titanium dioxide may be included in the topcoat if it is so desired. Coatings made in this manner on translucent paper also gave direct positive copies by reflex printing, using high intensity infrared radiation in a suitable exposing device.

The following examples of specific compositions and structures will serve more clearly to point out and explain the novel concept here involved but are not to be construed as limitative.

Example 1

The constituents of the coating composition are conveniently dispersed in the form of a 50% paste by ball milling for from four to twenty four hours with the appropriate solvent before mixing.

Quantities of constituents in the ratio of 10 parts benzamide, 2.7 parts triton $\beta$, 0.3 part Crystal Violet carbinol base and 20 parts of polyvinyl alcohol (Elvanol 32–70) as a 10% solution in a solvent comprising alcohol and water in 1:1 ratio were thoroughly mixed together to give a smooth well dispersed system and enough dilute sodium hydroxide (30% solution) was then added to discharge the color of the mixture from blue to colorless. This dispersion was coated on a translucent paper support in accordance with the first embodiment. The coated surface of such a sheet was placed in contact with an original to be copied and exposed to high intensity infrared radiation by reflex printing in a suitable exposing machine. A direct positive copy of the original was thus obtained having a high density blue violet image on a pure white background.

Example II

A dispersion of the same constituents in the same ratio of quantities was prepared as in Example I except that Elvanol 32-70 was replaced with an aqueous solution of either 20 parts ammonium polyacrylate, sodium polyacrylate or potassium polyacrylate (5% solution).

Example III

Quantities of constituents in the ratio of 20 parts sodium polyacrylate known under the trade name Polyco 296 N (5% solution), 20 parts benzamide, 0.4 part Crystal Violet carbinol base, 1.5 parts tetra methyl ammonium hydroxide (10% solution) and 0.5 part of sodium hydroxide in a 30% solution were thoroughly mixed to provide the heat sensitive composition.

Example IV

Quantities of constituents in the ratio of 10 parts sodium polyacrylate (Polyco 296, N 5% solution) 10 parts hydroxyethyl cellulose (10% solution), 0.4 part Crystal Violet carbinol base, 20 parts benzamide, 1.5 parts of tetramethyl ammonium hydroxide (10% solution) and 1.0 part of sodium hydroxide (30% solution) were thoroughly mixed to provide the dispersion utilized as the coating composition.

Example V

A dispersion was made by thoroughly mixing constituents in the ratio of 10 parts of sodium polyacrylate (Polyco 296, N 5% solution), 10 parts of hydroxyethyl cellulose (10% solution), 0.4 part Crystal Violet carbinol base, 20 parts benzamide, 0.4 part 2 p-dimethyl aminostyryl pyridine, 1.5 parts tetramethyl ammonium hydroxide (10% solution) and 1.0 part sodium hydroxide (30% solution).

Example VI

The following quantities of ingredients were mixed and stirred mechanically for two minutes and then applied as a coating; 125 cc. of polyvinyl alcohol (10% solution), sold under the trade name of Elvanol (50-42), 5 cc. of tetramethylammonium hydroxide (10% solution), 1.0 gram of Crystal Violet carbinol methylether (50% paste) and 30 grams of β-hydroxyethyl phthalimide (50% paste).

Example VII

Quantities comprising 1.0 gram of Crystal Violet carbinol methylether (50% paste), 35 grams of orthochlorobenzamide (50% paste), 0.5 cc. of tetramethylammonium hydroxide (10% solution), and 70 cc. of polyvinyl alcohol (Elvanol 50-42, 10% solution) were thoroughly mixed to provide the dispersion utilized as the coating composition.

While there have been described what are, at present, considered to be the preferred embodiments of this invention, it will be obvious to those skilled in the art that various changes and modifications may be made therein without departing from the invention, and it is, therefore, intended to cover all such modifications as fall within the true spirit and scope of the invention.

What is claimed is:

1. A heat sensitive copying sheet comprising a support and a heat sensitive layer thereon, said heat sensitive layer comprising a mixture of benzamide, tetramethylammonium hydroxide, Crystal Violet carbinol base and polyvinyl alcohol, the ratio of benzamide to tetramethylammonium hydroxide being chosen so that in the presence of heat said benzamide will cause the normally colorless dye base Crystal Violet carbinol to convert to the colored form.

2. A heat sensitive copying sheet comprising a support and a heat sensitive layer thereon, said heat sensitive layer comprising a mixture of benzamide, tetramethylammonium hydroxide, Crystal Violet carbinol base, polyvinyl alcohol and an alkali hydroxide, the ratio of benzamide to tetramethylammonium hydroxide and alkali hydroxide being chosen so that in the presence of heat said benzamide will cause the normally colorless dye base Crystal Violet carbinol to convert to the colored form.

3. A heat sensitive copying sheet comprising a support and a heat sensitive layer thereon, said heat sensitive layer comprising a mixture of a polyacrylate selected from the group consisting of ammonium, sodium and potassium polyacrylates, benzamide, Crystal Violet carbinol base, tetramethylammonium hydroxide and an alkali hydroxide, the ratio of benzamide to tetramethylammonium hydroxide and alkali hydroxide being chosen so that in the presence of heat said benzamide will cause the normally colorless dye base Crystal Violet carbinol to convert to the colored form.

4. A heat sensitive copying sheet comprising a support and a heat sensitive layer thereon, said heat sensitive layer comprising a mixture of sodium polyacrylate, benzamide, Crystal Violet carbinol base, tetramethylammonium hydroxide and an alkali hydroxide, the ratio of benzamide to tetramethylammonium hydroxide and alkali hydroxide being chosen so that in the presence of heat said benzamide will cause the normally colorless dye base Crystal Violet carbinol to convert to the colored form.

5. A heat sensitive copying sheet comprising a support and a heat sensitive layer thereon, said heat sensitive layer comprising a mixture of sodium polyacrylate, benzamide, Crystal Violet carbinol base, 2-p-dimethyl amino styryl pyridine, tetramethylammonium hydroxide, and an alkali hydroxide, the ratio of benzamide to tetramethylammonium hydroxide and alkali hydroxide being chosen so that in the presence of heat said benzamide will cause the normally colorless dye bases Crystal Violet carbinol and 2 p-dimethy aminostyryl pyridine to convert to the colored form.

6. A heat sensitive copying sheet comprising a support and a heat sensitive layer thereon, said heat sensitive layer comprising a mixture of polyvinyl alcohol, tetramethylammonium hydroxide, Crystal Violet carbinol methylether and β-hydroxyethylphthalimide, the ratio of β-hydroxyethylphthalimide to tetramethylammonium hydroxide being chosen so that in the presence of heat said β-hydroxyethylphthalimide will cause the normally colorless dye Crystal Violet carbinol methylether to convert to the colored form.

7. A heat sensitive copying sheet comprising a support and a heat sensitive layer thereon, said heat sensitive layer comprising a mixture of Crystal Violet carbinol methylether, orthochlorobenzamide, tetramethylammonium hydroxide, and polyvinyl alcohol, the ratio of orthochlorobenzamine to tetramethylammonium hydroxide being chosen so that in the presence of heat said orthochlorobenzamide will cause the normally colorless dye Crystal Violet carbinol methylether to convert to the colored form.

8. A coating composition comprising a dispersion of the carbinol base of Crystal Violet, tetramethylammonium hydroxide and benzamide in an alcohol-aqueous solution of polyvinyl alcohol, the ratio of benzamide to tetramethylammonium hydroxide being chosen so that in the presence of heat said benzamide will cause the normally colorless carbinol base of Crystal Violet to convert to the colored form.

9. A coating composition comprising a dispersion of benzamide, the carbinol base of Crystal Violet, tetramethylammonium hydroxide and an alkali hydroxide dispersed in sodium polyacrylate, the ratio of benzamide to tetramethylammonium hydroxide and alkali hydroxide being chosen so that in the presence of heat said benzamide will cause the normally colorless carbinol base of Crystal Violet to convert to the colored form.

10. A coating composition comprising the carbinol base of Crystal Violet, tetramethylammonium hydroxide and benzamide dispersed in a solution of a film former selected from the group consisting of ammonium, sodium and potassium polyacrylates, the ratio of benzamide to tetramethylammonium hydroxide being chosen so that in the presence of heat said benzamide will cause the normally colorless carbinol base of Crystal Violet to convert to the colored form.

11. A coating composition comprising a dispersion of benzamide, the carbinol base of Crystal Violet, tetramethylammonium hydroxide and an alkali hydroxide dispersed in a mixture of sodium polyacrylate and hydroxyethyl cellulose, the ratio of benzamide to tetramethylammonium hydroxide and alkali hydroxide being chosen so that in the presence of heat said benzamide will cause the normally colorless carbinol base of Crystal Violet to convert to the colored form.

12. A coating composition comprising a dispersion of the carbinol base of Crystal Violet, benzamide, 2 p-dimethyl aminostyryl pyridine, tetramethylammonium hydroxide and an alkali hydroxide dispersed in a mixture of sodium polyacrylate and hydroxyethyl cellulose, the ratio of benzamide to tetramethylammonium hydroxide and alkali hydroxide being chosen so that in the presence of heat said benzamide will cause the normally colorless dye 2 p-di-methyl aminostyryl pyridine and the carbinol base of Crystal Violet to convert to the colored form.

13. A coating composition comprising a dispersion of a paste of Crystal Violet carbinol methylether, a paste of β-hydroxy ethylphthalimide and a solution of tetramethylammonium hydroxide dispersed in a polyvinyl alcohol solution, the ratio of β-hydroxyethylphthalimide to tetramethylammonium hydroxide being chosen to that in the presence of heat said β-hydroxyethylphthalimide will cause the normally colorless dye Crystal Violet carbinol methylether to convert to the colored form.

14. A coating composition comprising a dispersion of a paste of Crystal Violet carbinol methylether, a paste of orthochlorobenzamide, and a solution of tetramethylammonium hydroxide in a solution of polyvinyl alcohol, the ratio of orthochlorobenzamide to tetramethylammonium hydroxide being chosen so that in the presence of heat said orthochlorobenzamide will cause the normally colorless dye Crystal Violet carbinol methylether to convert to the colored form.

15. A coating composition comprising a dispersion of a paste of Crystal Violet carbinol methylether, a paste of chloroacetamide, a paste of potassium carbonate and a solution of ethyl cellulose in methanol, the ratio of chloroacetamide to potassium carbonate being chosen so that in the presence of heat said chloroacetamide will cause the normally colorless dye Crystal Violet carbinol methylether to convert to the colored form.

16. A heat sensitive copying sheet comprising a support and a heat sensitive layer thereon, the heat sensitive layer comprising a colorless dye base derived from a member of the group consisting of the triphenylmethane dyes and styryl dye bases, an acid forming substance selected from the group consisting of hydrated zinc acetate, benzamide, chloracetamide, 2-naphthylacetamide, and hydroxyethylphthalimide, for forming an acid in the presence of heat, a film former, and a relatively strong base for maintaining the dye in its colorless form at room temperature, the ratio of said acid forming substance and bases being chosen so that in the presence of heat said acid forming substance will convert the colorless base to the colored form.

17. The heat sensitive copying sheet of claim 16 wherein said film former is a member selected from the group consisting of polyvinyl alcohol, sodium polyacrylate, potassium polyacrylate and ammonium polyacrylate.

18. The heat sensitive copying sheet of claim 17 wherein said relatively strong base is selected from the group consisting of sodium hydroxide, potassium hydroxide and a quaternary ammonium hydroxide.

References Cited in the file of this patent
UNITED STATES PATENTS

| | | |
|---|---|---|
| 1,351,071 | Silverman | Aug. 31, 1920 |
| 2,474,084 | Adams | June 21, 1949 |
| 2,595,957 | Kunze | May 6, 1952 |
| 2,618,573 | Green | Nov. 18, 1952 |
| 2,755,200 | Balon | July 17, 1956 |
| 2,755,201 | Webber | July 17, 1956 |